US012229326B2

(12) United States Patent
Shachar et al.

(10) Patent No.: US 12,229,326 B2
(45) Date of Patent: Feb. 18, 2025

(54) MULTI-CLOUD FRAMEWORK FOR DATA PROTECTION USING THRESHOLD-BASED FILE RECONSTRUCTION

(71) Applicant: EMC IP Holding Company LLC, Hopkinton, MA (US)

(72) Inventors: Tomer Shachar, Omer (IL); Maxim Balin, Gan Yavne (IL); Yevgeni Gehtman, Modi'in (IL); Boris Giterman, Beer Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 485 days.

(21) Appl. No.: 17/089,801

(22) Filed: Nov. 5, 2020

(65) Prior Publication Data

US 2022/0138352 A1 May 5, 2022

(51) Int. Cl.
G06F 21/78 (2013.01)
G06F 3/06 (2006.01)
G06F 21/60 (2013.01)
G06F 21/62 (2013.01)

(52) U.S. Cl.
CPC ............ G06F 21/78 (2013.01); G06F 3/0623 (2013.01); G06F 3/0659 (2013.01); G06F 3/067 (2013.01); G06F 21/602 (2013.01); G06F 21/6254 (2013.01)

(58) Field of Classification Search
CPC ...... G06F 21/78; G06F 3/0623; G06F 3/0659; G06F 3/067; G06F 21/602; G06F 21/6254; G06F 21/60; G06F 3/06; G06F 21/62
See application file for complete search history.

(56) References Cited

U.S. PATENT DOCUMENTS

| | | | | |
|---|---|---|---|---|
| 10,235,240 | B2 * | 3/2019 | Tormasov | H03M 13/3761 |
| 10,310,765 | B1 * | 6/2019 | Laurence | G06F 3/067 |
| 2005/0203968 | A1 * | 9/2005 | Dehghan | H04L 67/34 |
| | | | | 707/999.203 |
| 2006/0168147 | A1 * | 7/2006 | Inoue | H04L 12/14 |
| | | | | 709/219 |
| 2012/0089829 | A1 * | 4/2012 | Kholidy | H04L 63/0457 |
| | | | | 713/153 |
| 2014/0047040 | A1 * | 2/2014 | Patiejunas | G06F 16/1734 |
| | | | | 709/219 |

(Continued)

OTHER PUBLICATIONS https://www.networkcomputing.com/data-centers/data-protection-public-cloud-6-steps.

(Continued)

Primary Examiner — Jung W Kim
Assistant Examiner — Howard H. Louie
(74) Attorney, Agent, or Firm — Ryan, Mason & Lewis, LLP

(57) ABSTRACT

Techniques are provided for multi-cloud data protection using threshold-based file reconstruction. One method comprises obtaining a file comprising metadata and data for storage in a cloud environment; generating a plurality of encrypted file portions from the data; and uploading each of the encrypted file portions with the metadata as cloud objects to multiple different cloud environments. A threshold number of the encrypted file portions are needed from at least two different cloud environments to reconstruct the file. For file reconstruction, the threshold number of encrypted file portions can be validated, merged and decrypted.

20 Claims, 6 Drawing Sheets

(56) References Cited

U.S. PATENT DOCUMENTS

2014/0095966 A1* 4/2014 Burkard .............. G06F 16/9574
                                                    715/205
2016/0277185 A1* 9/2016 Shulha ................ H04W 12/068
2018/0359811 A1* 12/2018 Verzun .................. H04W 28/12

OTHER PUBLICATIONS https://www2.deloitte.com/content/dam/Deloitte/ca/Documents/risk/ca-en-risk-privacy-in-the-cloud-pov.PDF.
https://www.delltechnologies.com/en-us/learn/data-protection/cloud-data-protection.htm.
https://www.researchgate.net/publication/304290641_SSM_Secure-Split-merge_data_distribution_in_cloud_infrastructure.
http://www.apsipa.org/proceedings/2018/pdfs/0000247.pdf.
https://arxiv.org/ftp/arxiv/papers/1707/1707.00445.pdf.

* cited by examiner

MULTI-CLOUD FRAMEWORK FOR DATA PROTECTION USING THRESHOLD-BASED FILE RECONSTRUCTION

FIELD

The field relates generally to information processing systems and more particularly, to the protection of data in such information processing systems.

BACKGROUND

Data protection techniques are often employed to secure data in a cloud environment, typically using data protection functions provided by the cloud provider. Many organizations, however, do not trust a public cloud for the storage of sensitive information. Such organizations fear external threats from outside of a given public cloud environment and/or internal threats from within the provider of a given public cloud.

A need exists for improved techniques for protecting data in a cloud environment.

SUMMARY

In one embodiment, a method comprises obtaining a file for storage in at least one cloud environment, wherein the file comprises metadata and data; generating a plurality of encrypted file portions from the data; and uploading each of the plurality of encrypted file portions with at least a portion of the metadata as cloud objects to a plurality of different cloud environments, wherein a threshold number of the encrypted file portions from at least two of the different cloud environments are needed to reconstruct the file.

In some embodiments, the threshold number of the encrypted file portions is obtained from the at least two different cloud environments and a validation is applied to the obtained threshold number of the encrypted file portions. The obtained encrypted file portions can be merged to generate merged encrypted file portions and the file can be reconstructed by decrypting the merged encrypted file portions.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for multi-cloud data protection using threshold-based file reconstruction.

In one or more embodiments, techniques are provided for the protection of data in a public cloud environment by storing portions of the data in multiple clouds and using threshold-based file reconstruction techniques to reconstruct the original data, whereby a predefined number of portions of the original data are needed from the multiple clouds to reconstruct the original data. One or more aspects of the disclosure recognize that the likelihood that an attacker can obtain a number of file portions that is above the reconstruction threshold is significantly reduced.

Figure 1:
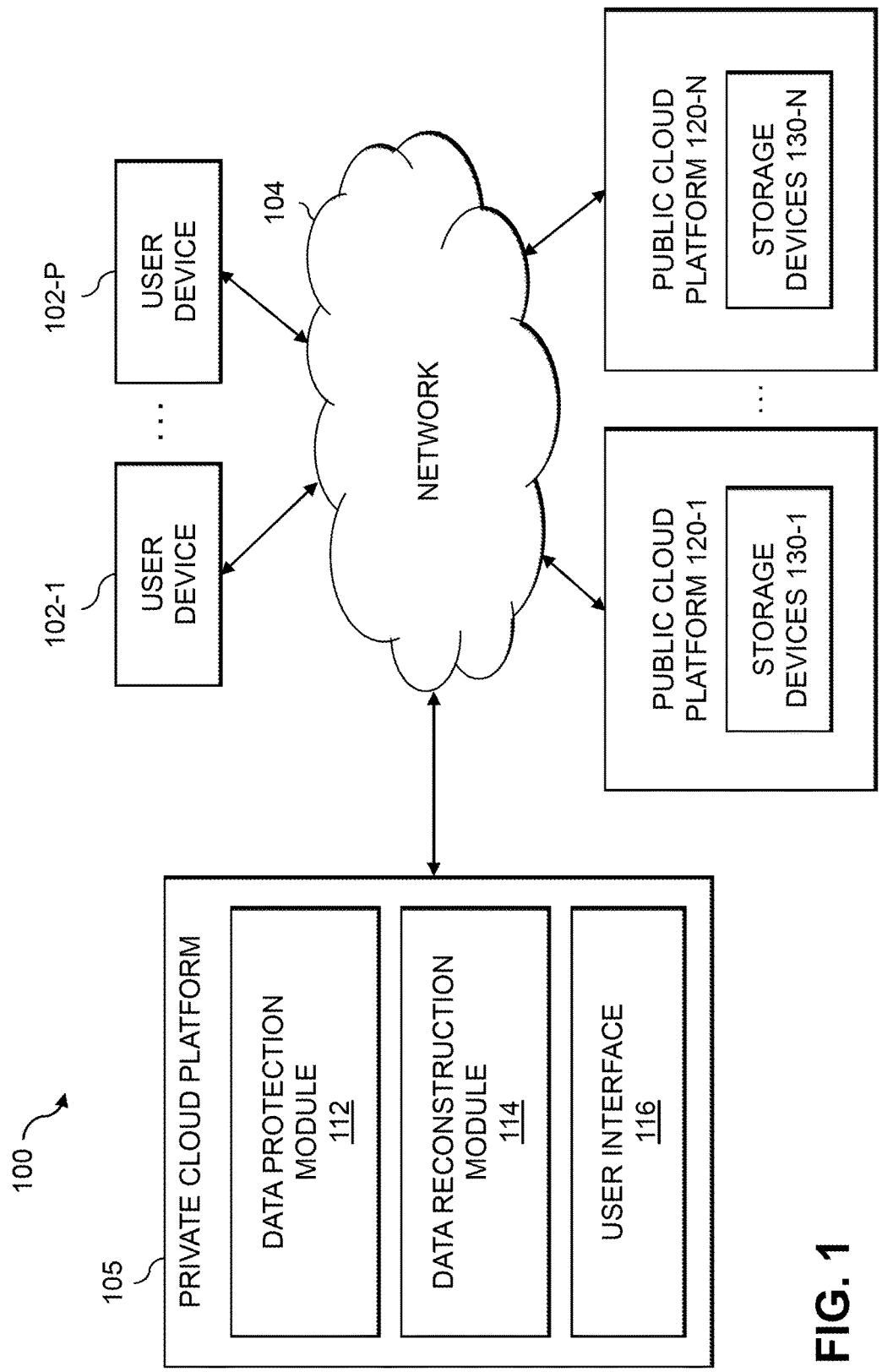
FIG. 1 illustrates an information processing system configured for multi-cloud data protection using threshold-based file reconstruction in accordance with an illustrative embodiment.

FIG. 1 shows a computer network (also referred to herein as an information processing system) 100 configured in accordance with an illustrative embodiment. The computer network 100 comprises a plurality of user devices 102-1 through 102-P, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is a private cloud platform 105 and a plurality of public cloud platforms 120-1 through 120-N (hereinafter, collectively referred to as cloud platforms 120).

In some embodiments, the private cloud platform 105 can be implemented on the premises of a respective organization, such as part of a data center. In other embodiments, the sensitive data of an organization that is protected using the disclosed multi-cloud data protection techniques can be stored in a traditional data center that is not part of a private cloud.

The user devices 102 may comprise, for example, host devices and/or devices such as mobile telephones, laptop computers, tablet computers, desktop computers or other types of computing devices. Such devices are examples of what are more generally referred to herein as "processing devices." Some of these processing devices are also generally referred to herein as "computers." The user devices 102 may comprise a network client that includes networking capabilities such as ethernet, Wi-Fi, etc. When the user devices 102 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices. Such applications illustratively generate input-output (TO) operations that are processed by a storage system. The term "input-output" as used herein refers to at least one of input and output. For example, IO operations may comprise write requests and/or read requests directed to logical addresses of a particular logical storage volume of the storage system. These and other types of IO operations are also generally referred to herein as IO requests.

The user devices 102 in some embodiments comprise respective processing devices associated with a particular company, organization or other enterprise or group of users.

In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The public cloud platforms 120 illustratively comprise processing devices of one or more processing platforms. For example, the public cloud platforms 120 can comprise one or more processing devices each having a processor and a memory, possibly implementing virtual machines and/or containers, although numerous other configurations are possible.

The public cloud platforms 120 can be part of cloud infrastructure such as an Amazon Web Services (AWS) system. Other examples of cloud-based systems that can be used to provide at least portions of the public cloud platforms 120 include Google Cloud Platform (GCP), Microsoft Azure, Dell Technologies Cloud, IBM Cloud, Alibaba Cloud and HPe (Hewlett Packard Enterprise) Cloud.

The public cloud platforms 120 each comprise one or more storage devices 130-1 through 130-N. The storage devices 130 store data of a plurality of storage volumes, such as respective logical units (LUNs) or other types of logical storage volumes. The term "storage volume" as used herein is intended to be broadly construed, and should not be viewed as being limited to any particular format or configuration.

The user devices 102 and the private cloud platform 105 may be implemented on a common processing platform, or on separate processing platforms. The user devices 102 (for example, when implemented as host devices) are illustratively configured to write data to and read data from one or more of the storage devices 130 on the public cloud platforms 120 in accordance with applications executing on those host devices for system users.

The storage devices 130 of the public cloud platforms 120 illustratively comprise solid state drives (SSDs). Such SSDs are implemented using non-volatile memory (NVM) devices such as flash memory. Other types of NVM devices that can be used to implement at least a portion of the storage devices 130 include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the public cloud platforms 120.

It is therefore to be appreciated that numerous different types of storage devices 130 can be used in public cloud platforms 120 in other embodiments. For example, a given public cloud platform 120 as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as network-attached storage (NAS), storage area networks (SANs), direct-attached storage (DAS) and distributed DAS, as well as combinations of these and other storage types, including software-defined storage.

In some embodiments, communications between the user devices 102 (for example, when implemented as host devices) and the storage devices 130 of the public cloud platforms 120 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the user devices 102 to communicate with the public cloud platforms 120 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The user devices 102 are configured to interact over the network 104 with one or more of the public cloud platforms 120. Such interaction illustratively includes generating IO operations, such as write and read requests, and sending such requests over the network 104 for processing by one or more of the public cloud platforms 120. In some embodiments, each of the user devices 102 comprises a driver configured to control delivery of IO operations from the host device to one or more of the public cloud platforms 120 over one or more paths through the network 104.

The public cloud platforms 120 may further include one or more additional modules and other components typically found in conventional implementations of public cloud storage systems, although such additional modules and other components are omitted from the figure for clarity and simplicity of illustration.

The public cloud platforms 120 in the FIG. 1 embodiment are assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the user devices 102 (for example, when implemented as host devices) may be implemented in whole or in part on the same processing platform as the public cloud platforms 120 or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and the public cloud platforms 120 to reside in different data centers. Numerous other distributed implementations of the host devices and the public cloud platforms 120 are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

As also depicted in FIG. 1, the private cloud platform 105 further comprises a data protection module 112, a data reconstruction module 114, and a user interface 116.

It is to be appreciated that this particular arrangement of modules 112, 114 and 116 illustrated in the private cloud platform 105 of the FIG. 1 embodiment is presented by way of example only, and alternative arrangements can be used in other embodiments. For example, the functionality associated with modules 112, 114 and 116 in other embodiments can be combined into a single module, or separated across a larger number of modules. As another example, multiple distinct processors can be used to implement different ones of modules 112, 114 and 116 or portions thereof.

At least portions of modules 112, 114 and 116 may be implemented at least in part in the form of software that is stored in memory and executed by a processor. An exemplary process utilizing modules 112, 114 and 116 of an example private cloud platform 105 in computer network 100 will be described in more detail with reference to the flow diagrams of, for example, FIGS. 3 and 4.

The private cloud platform 105 can further comprise one or more input-output devices (not shown), which illustratively comprise keyboards, displays or other types of input-output devices in any combination. Such input-output devices can be used, for example, to support one or more user interfaces 116 to the private cloud platform 105, as well as to support communication between the private cloud platform 105 and other related systems and devices not explicitly shown.

The user devices 102 and the private cloud platform 105 in the FIG. 1 embodiment are assumed to be implemented using at least one processing device. Each such processing device generally comprises at least one processor and an associated memory, and implements one or more functional modules for controlling certain features of the private cloud platform 105.

More particularly, user devices 102 and private cloud platform 105 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the user devices 102, the private cloud platform 105, and/or one or more of the public cloud platforms 120 to communicate over the network 104 with each other (as well as one or more other networked devices), and illustratively comprises one or more conventional transceivers.

It is to be understood that the particular set of elements shown in FIG. 1 for multi-cloud data protection using threshold-based file reconstruction is presented by way of illustrative example only, and in other embodiments additional or alternative elements may be used. Thus, another embodiment includes additional or alternative systems, devices and other network entities, as well as different arrangements of modules and other components.

For example, while one or more embodiments of the disclosure are illustrated using multiple public clouds for the storage of encrypted file portions, any cloud environment may be employed to store the encrypted file portions. The term "cloud environment," as used herein, shall be broadly construed to encompass public clouds, private clouds, data centers, portions thereof and/or combinations thereof, as those terms are understood by a person of ordinary skill in the art.

Figure 2:
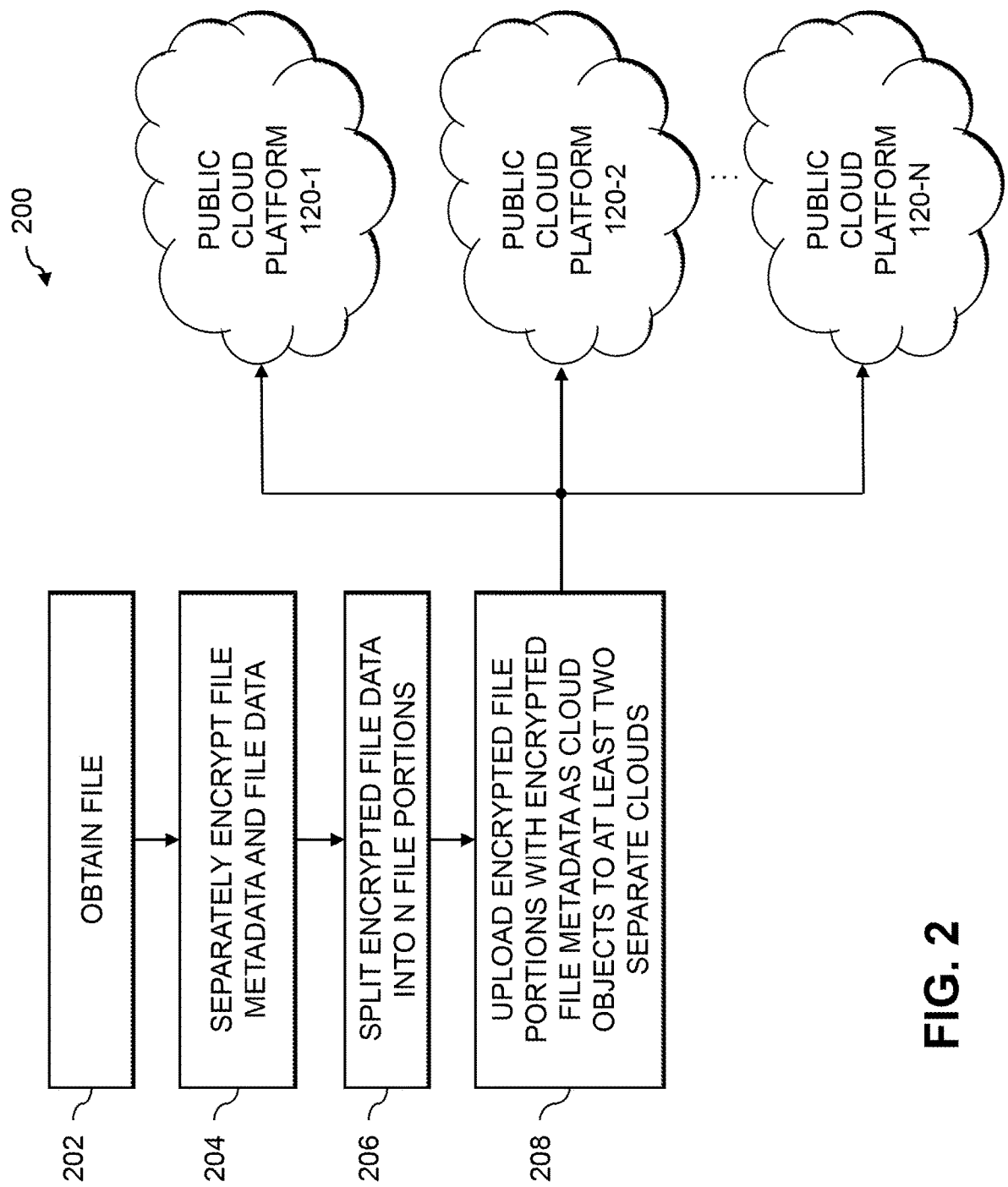
FIGS. 2 through 4 are flow diagrams illustrating exemplary implementations of multi-cloud data protection processes using threshold-based file reconstruction, according to various embodiments.

FIG. 2 is a flow diagram illustrating an exemplary implementation of a file splitting and multi-cloud uploading process 200 for threshold-based file reconstruction, according to one or more embodiments. In some embodiments, the file splitting and multi-cloud uploading process 200 is performed in-memory by the data protection module 112 of private cloud platform 105.

Generally, the upload functionality of the exemplary file splitting and multi-cloud uploading process 200 allows a user to upload files to a protected multi-cloud environment. As shown in FIG. 2, the exemplary file splitting and multi-cloud uploading process 200 initially obtains a file to be protected at step 202. At step 204, the exemplary file splitting and multi-cloud uploading process 200 separately encrypts the metadata and data portions of the file. In other embodiments, the metadata is not encrypted.

In some embodiments, the metadata comprises a filename, one or more locations indicating where the file is stored in one or more of the public cloud platforms 120, and/or other cloud-specific properties. The encryption and/or data anonymization that may be applied to the metadata at step 204 removes sensitive and/or proprietary information from the metadata before it is uploaded to a public cloud platform 120. As used herein, the term "data anonymization" shall be broadly construed, so as to encompass, for example, homomorphic encryption, a globally unique identifier, data anonymization, data sanitation and other techniques to protect data privacy.

The encrypted file data is split into N file portions at step 206. For example, the N file portions may comprise one or more shard portions and one or more parity portions (e.g., for error correction) using Reed-Solomon techniques. Generally, as noted above, the threshold-based file reconstruction techniques require a predefined number (e.g., M) of portions of the N file portions to reconstruct the original data, as would be apparent to a person of ordinary skill in the art. Consider a file that is split into two shard portions and one parity portion, for a total of N=3 file portions. In this example, two (=M) of the file portions are needed to reconstruct the file. Thus, as long as only one of the shard portions is corrupted or cannot otherwise be obtained, the data can be reconstructed from the remaining shard portion and the parity portion. In another example, a file that is split into four shard portions and two parity portions, for a total of N=6 file portions. In this example, four (=M) of the file portions are needed to reconstruct the file. Thus, as long as only one or two of the shard portions are corrupted or cannot otherwise be obtained, the data can be reconstructed from the remaining shard and parity portions.

At step 208, the encrypted file portions are uploaded with at least a portion of the encrypted file metadata as cloud objects to at least two separate cloud environments, such as public cloud platforms 120-1 through 120-N, where each public cloud platform stores a different encrypted file portion.

Figure 3:
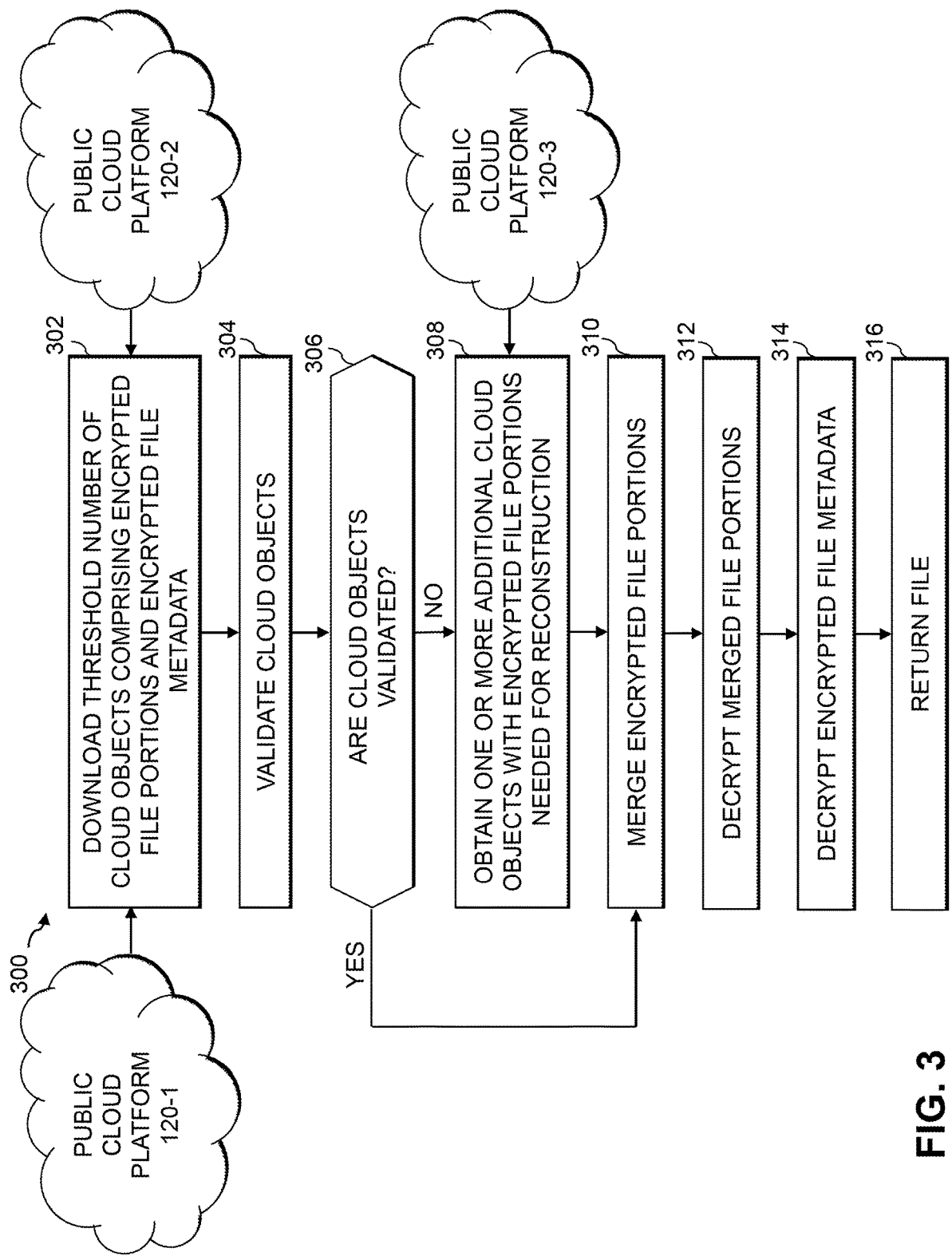

FIG. 3 is a flow diagram illustrating an exemplary implementation of a multi-cloud data reconstruction process 300 that uses threshold-based file reconstruction, according to at least some embodiments. In the example of FIG. 3, assume that encrypted shard portions are uploaded to public cloud platforms 120-1 and 120-2 and an encrypted parity portion is uploaded to public cloud platform 120-3. In some embodiments, the multi-cloud data reconstruction process 300 is implemented by the data reconstruction module 114 of private cloud platform 105, for example, when a user downloads the file.

In one or more embodiments, the exemplary multi-cloud data reconstruction process 300 obtains the threshold number of file portions needed for reconstruction of the original file. If one or more portions are missing or corrupted, the exemplary multi-cloud data reconstruction process 300 obtains one or more additional portions from one or more other cloud providers 120, so that the original file can be reassembled, and the encryption can be removed before returning the file to a user.

As shown in FIG. 3, the exemplary multi-cloud data reconstruction process 300 initially downloads a threshold number of cloud objects comprising the encrypted file portions and encrypted file metadata at step 302, and then validates the downloaded cloud objects at step 304. For example, a file signature (e.g., a hash value and/or an MD5 message digest value) can be used to detect corruption.

A test is performed at step 306 to determine if the obtained cloud objects have been validated. If it is determined in step 306 that the obtained cloud objects are not validated, then one or more additional cloud objects with the encrypted file portions needed for reconstruction are obtained at step 308. For example, if one or more shard portions are corrupted or cannot be obtained from public cloud platform 120-1 or 120-2, a parity portion can be obtained from public cloud platform 120-3 to perform error correction, in a known manner.

If, however, it is determined in step 306 that the obtained cloud objects are validated (or after the encrypted file portions needed for reconstruction are obtained at step 308), then the encrypted file portions are merged at step 310 and the merged file portions are decrypted at step 312.

The encrypted file metadata portions are decrypted at step 314, and the file is returned at step 316.

Figure 4:
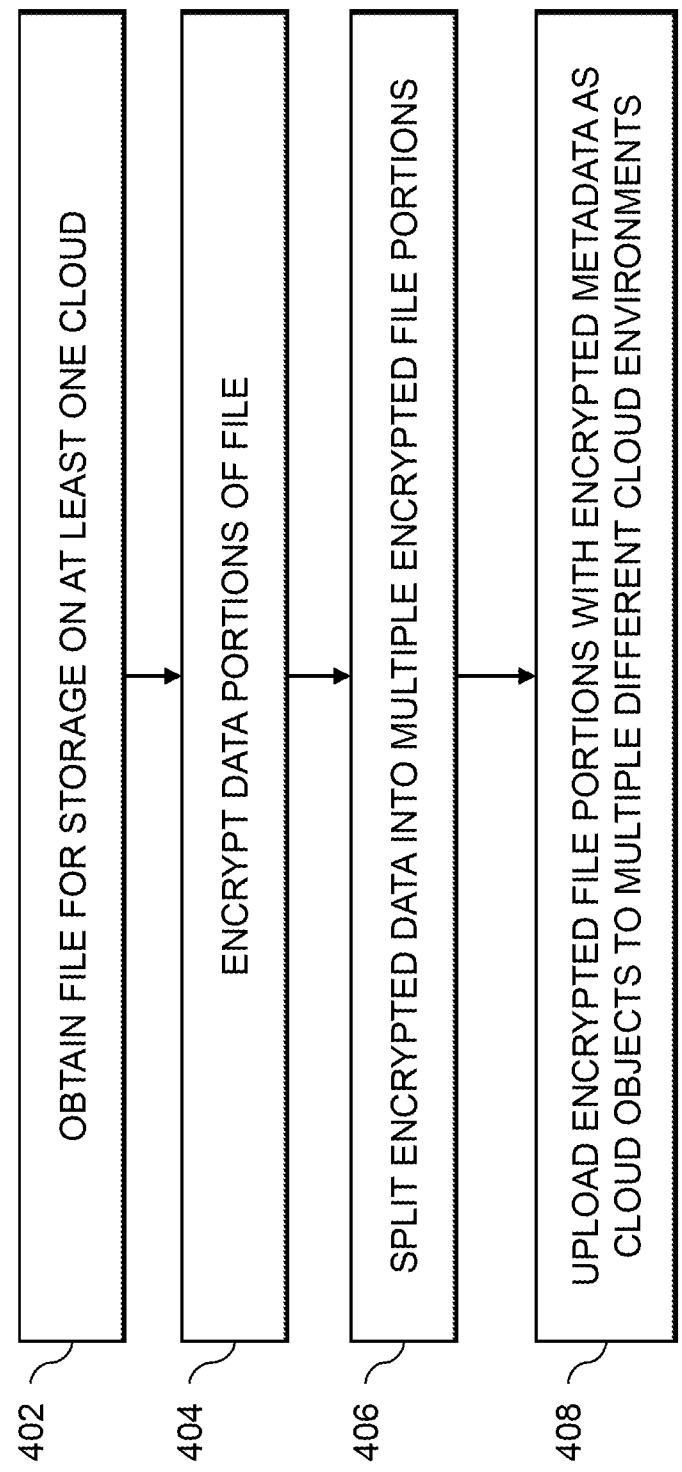

FIG. 4 is a flow diagram illustrating an exemplary implementation of a multi-cloud data protection process that employs threshold-based file reconstruction, according to some embodiments. As shown in FIG. 4, the exemplary multi-cloud data protection process 400 initially obtains a file for storage on at least one cloud at step 402, wherein the file comprises metadata and data. The data is encrypted at step 404 and the encrypted data is split into a plurality of encrypted file portions at step 406. The metadata may also be encrypted at step 404. It is noted that in other embodiments, the plurality of encrypted file portions can be generated by splitting the data into a plurality of file portions and then encrypting the plurality of file portions.

The exemplary multi-cloud data protection process then uploads each of the plurality of encrypted file portions with at least a portion of the metadata as cloud objects to a plurality of different cloud environments at step 408. A threshold number of the encrypted file portions from at least two different cloud environments are needed to reconstruct the file.

The particular processing operations and other network functionality described in conjunction with the flow diagrams of FIGS. 2, 3 and 4 are presented by way of illustrative example only, and should not be construed as limiting the scope of the disclosure in any way. Alternative embodiments can use other types of processing operations for multi-cloud data protection using threshold-based file reconstruction. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

One or more embodiments of the disclosure provide improved methods, apparatus and computer program products for multi-cloud data protection using threshold-based file reconstruction. The foregoing applications and associated embodiments should be considered as illustrative only, and numerous other embodiments can be configured using the techniques disclosed herein, in a wide variety of different applications.

Among other benefits, the disclosed techniques for multi-cloud data protection using threshold-based file reconstruction waste the time of a potential attacker, without their knowledge. The disclosed multi-cloud data protection techniques break the cyber kill chain at the first step, and the attacker is not aware of the inherent data protection. Since the data protection is implemented in at least some embodiments in the private cloud platform 105, each public cloud provider has only encrypted portions of the original data that will not permit reconstruction.

It should also be understood that the disclosed multi-cloud data protection techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for multi-cloud data protection using threshold-based file reconstruction may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based multi-cloud data protection engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based multi-cloud data protection platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
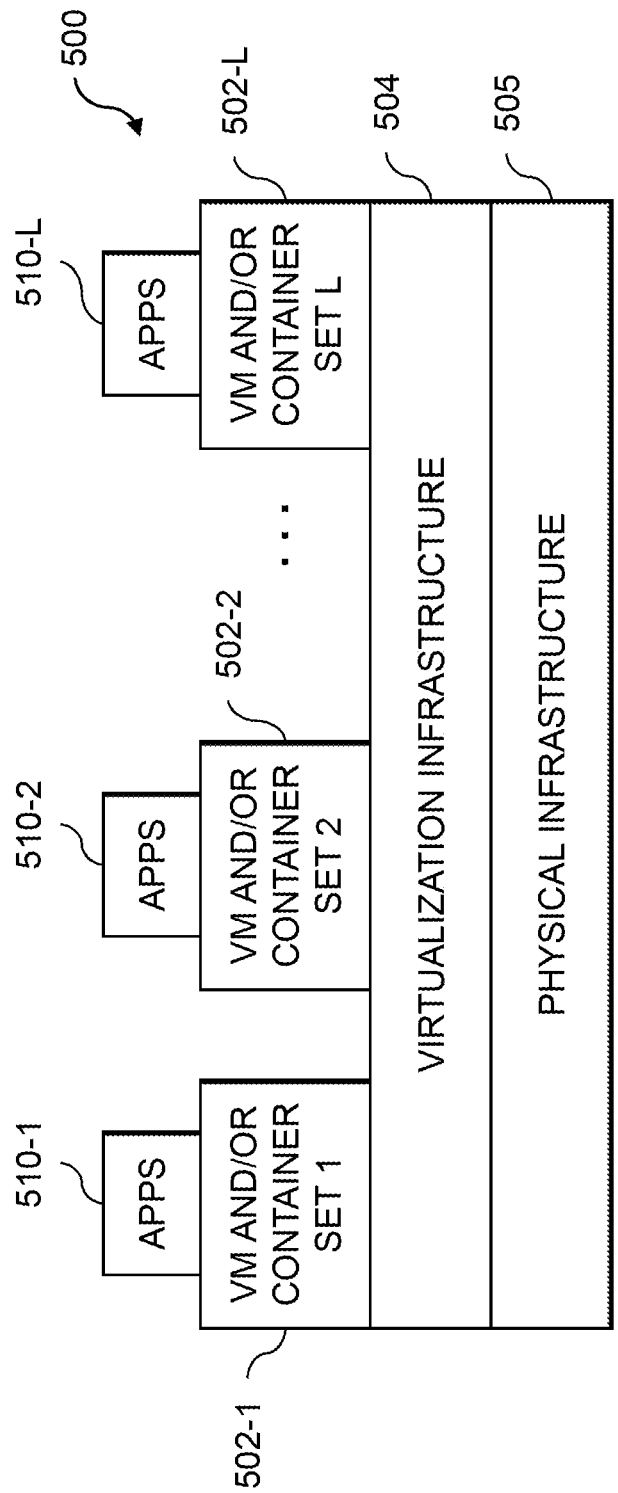
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide multi-cloud data protection functionality of the type described above for one or more processes running on a given one of the VMs. For example, each of the VMs can implement multi-cloud data protection control logic and file reconstruction functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide multi-cloud data protection functionality of the type described above for one or more processes running on different ones of the containers. For example, a container host device supporting multiple containers of one or more container sets can implement one or more instances of multi-cloud data protection control logic and associated file reconstruction functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a WAN, a LAN, a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an ASIC, an FPGA or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Figure 6:
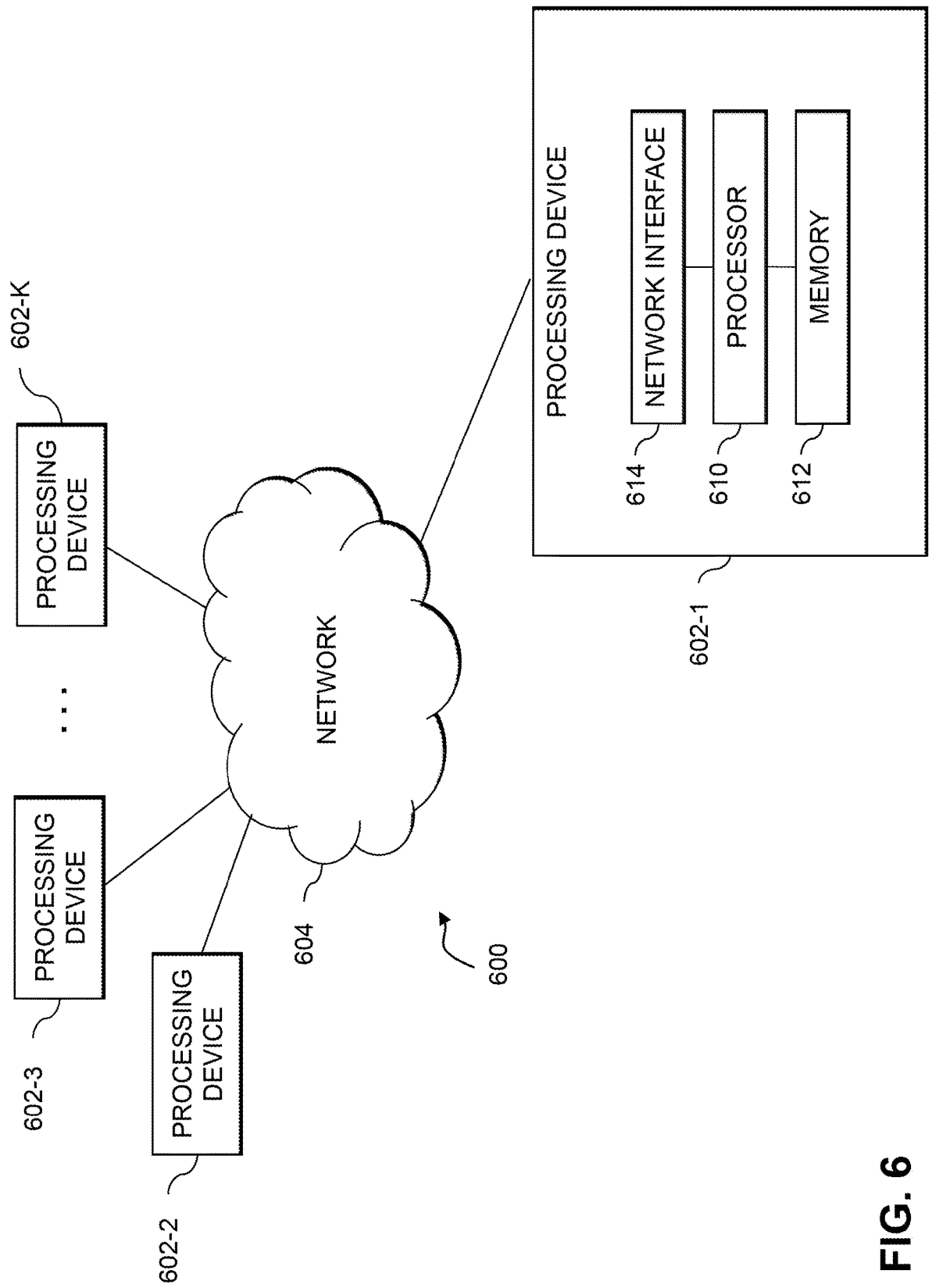
FIG. 6 illustrates another exemplary processing platform that may be used to implement at least a portion of one or more embodiments of the disclosure.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining a file for storage in at least one cloud environment, wherein the file comprises metadata and data;
    generating a plurality of encrypted file portions from the data; and
    uploading each of the plurality of encrypted file portions with at least a portion of the metadata as cloud objects to a plurality of different cloud environments, wherein a threshold number of the encrypted file portions from at least two of the different cloud environments are needed to reconstruct the file, wherein at least one additional encrypted file portion is obtained from at least one of the different cloud environments in response to at least one of the obtained threshold number of the encrypted file portions one or more of:
(i) failing a validation of the threshold number of the encrypted file portions needed to reconstruct the file and (ii) being missing, wherein the at least one additional encrypted file portion comprises a different encrypted file portion than the at least one encrypted file portion that is one or more of failed and missing, and wherein the threshold number of the encrypted file portions needed to reconstruct the file is less than a total number of the generated plurality of encrypted file portions;

wherein the method is performed by at least one processing device comprising a processor coupled to a memory.

2. The method of claim 1, wherein the plurality of different cloud environments is provided by a plurality of different cloud providers.

3. The method of claim 1, wherein a number of the encrypted file portions in the plurality of uploaded encrypted file portions is greater than the threshold number.

4. The method of claim 1, wherein the threshold number of the encrypted file portions is obtained from the at least two of the different cloud environments and the validation is applied to the obtained threshold number of the encrypted file portions.

5. The method of claim 4, further comprising merging the obtained encrypted file portions to generate merged encrypted file portions.

6. The method of claim 5, wherein the file is reconstructed by decrypting the merged encrypted file portions.

7. The method of claim 1, further comprising one or more of encrypting and anonymizing the at least the portion of the metadata.

8. The method of claim 1, wherein the generating the plurality of encrypted file portions further comprises one or more of: (i) encrypting the data and splitting the encrypted data into a plurality of encrypted file portions, and (ii) splitting the data into a plurality of file portions and encrypting the plurality of file portions.

9. The method of claim 1, wherein the at least one additional encrypted file portion is obtained from a different cloud environment than the at least one encrypted file portion that is one or more of failed and missing.

10. An apparatus comprising:
at least one processing device comprising a processor coupled to a memory;
the at least one processing device being configured to implement the following steps:
obtaining a file for storage in at least one cloud environment, wherein the file comprises metadata and data;
generating a plurality of encrypted file portions from the data; and
uploading each of the plurality of encrypted file portions with at least a portion of the metadata as cloud objects to a plurality of different cloud environments, wherein a threshold number of the encrypted file portions from at least two of the different cloud environments are needed to reconstruct the file, wherein at least one additional encrypted file portion is obtained from at least one of the different cloud environments in response to at least one of the obtained threshold number of the encrypted file portions one or more of:
(i) failing a validation of the threshold number of the encrypted file portions needed to reconstruct the file and (ii) being missing, wherein the at least one additional encrypted file portion comprises a different encrypted file portion than the at least one encrypted file portion that is one or more of failed and missing, and wherein the threshold number of the encrypted file portions needed to reconstruct the file is less than a total number of the generated plurality of encrypted file portions.

11. The apparatus of claim 10, wherein a number of the encrypted file portions in the plurality of uploaded encrypted file portions is greater than the threshold number.

12. The apparatus of claim 10, wherein the threshold number of the encrypted file portions is obtained from the at least two of the different cloud environments and the validation is applied to the obtained threshold number of the encrypted file portions.

13. The apparatus of claim 12, further comprising merging the obtained encrypted file portions to generate merged encrypted file portions and reconstructing the file by decrypting the merged encrypted file portions.

14. The apparatus of claim 10, wherein the plurality of different cloud environments is provided by a plurality of different cloud providers.

15. A non-transitory processor-readable storage medium having stored therein program code of one or more software programs, wherein the program code when executed by at least one processing device causes the at least one processing device to perform the following steps:
obtaining a file for storage in at least one cloud environment, wherein the file comprises metadata and data;
generating a plurality of encrypted file portions from the data; and
uploading each of the plurality of encrypted file portions with at least a portion of the metadata as cloud objects to a plurality of different cloud environments, wherein a threshold number of the encrypted file portions from at least two of the different cloud environments are needed to reconstruct the file, wherein at least one additional encrypted file portion is obtained from at least one of the different cloud environments in response to at least one of the obtained threshold number of the encrypted file portions one or more of:
(i) failing a validation of the threshold number of the encrypted file portions needed to reconstruct the file and (ii) being missing, wherein the at least one additional encrypted file portion comprises a different encrypted file portion than the at least one encrypted file portion that is one or more of failed and missing, and wherein the threshold number of the encrypted file portions needed to reconstruct the file is less than a total number of the generated plurality of encrypted file portions.

16. The non-transitory processor-readable storage medium of claim 15, wherein a number of the uploaded encrypted file portions in the plurality of encrypted file portions is greater than the threshold number.

17. The non-transitory processor-readable storage medium of claim 15, wherein the threshold number of the encrypted file portions is obtained from the at least two of the different cloud environments and the validation is applied to the obtained threshold number of the encrypted file portions.

18. The non-transitory processor-readable storage medium of claim 17, further comprising merging the obtained encrypted file portions to generate merged encrypted file portions and reconstructing the file by decrypting the merged encrypted file portions.

19. The non-transitory processor-readable storage medium of claim 15, further comprising one or more of encrypting and anonymizing the at least the portion of the metadata.

20. The non-transitory processor-readable storage medium of claim 15, wherein the plurality of different cloud environments is provided by a plurality of different cloud providers.

\* \* \* \* \*